United States Patent [19]

Kowachek et al.

[11] 3,902,765
[45] Sept. 2, 1975

[54] TENSION CONTROL FOR FLEXIBLE TIRE CONNECTORS

[75] Inventors: Victor J. Kowachek, Mt. Clemens, Mich.; James P. Carr, Silver Spring, Md.; Harold G. Kirchner, Issaquah, Wash.

[73] Assignee: The United States of America as represented by the Secretary of the Army, Washington, D.C.

[22] Filed: July 26, 1974

[21] Appl. No.: 492,103

[52] U.S. Cl. .................................. 305/34; 115/1 R
[51] Int. Cl.$^2$ ......................................... B62D 55/00
[58] Field of Search .............. 305/8, 10, 16, 17, 18, 305/34; 115/1 R

[56] References Cited
UNITED STATES PATENTS

| | | | |
|---|---|---|---|
| 3,170,533 | 2/1965 | Fewel | 305/34 |
| 3,207,562 | 9/1965 | Ewing | 305/8 |
| 3,481,654 | 12/1969 | Hartlerode | 305/34 |
| 3,539,229 | 11/1970 | Scully | 305/10 |
| 3,773,394 | 11/1973 | Graney | 305/34 |

*Primary Examiner*—Philip Goodman
*Assistant Examiner*—John A. Carroll
*Attorney, Agent, or Firm*—Peter A. Taucher; John E. McRae; Robert P. Gibson

[57] ABSTRACT

A multi-terrain vehicle having ground-engaging tires arranged for orbital movement along upper and lower surfaces of sponsons located outboard of the hull. The tires are interconnected by means of chains, cables or similar flexible track elements; the tires move along the ground surface in one direction to develop vehicle propulsion thrust in the opposite direction. This invention relates to mechanisms for controlling the tension in the flexible tire-connector elements, thereby preventing the elements from breaking or stretching or disengaging from their guide wheels. Tension control is achieved by restraining the tires against twisting or moving laterally, and also by maintaining the sponson surfaces relatively free from accumulations of debris such as mud, twigs, etc that would tend to space the tires away from the sponson surfaces; the primary tension control instrumentality is a fluid cylinder acting on the idler guide wheels for the tire-connector elements.

4 Claims, 13 Drawing Figures

TENSION CONTROL FOR FLEXIBLE TIRE CONNECTORS

The invention described herein may be manufactured, used, and licensed by or for the Government for governmental purposes without payment to us of any royalty thereon.

BACKGROUND OF THE INVENTION

U.S. Pat. No. 3,154,045 issued to A. G. Fisher and U.S. Pat. No. 2,916,006 iddued to L. Crandall show amphibious multi-terrain vehicles adapted for use in water, mud and deep snow, as well as on conventional roads. In each case the vehicle is powered by means of tires, whose axles are connected to endless belts or cables trained around pulleys at the front and rear ends of the vehicle. The tires thus orbit in the fashion of endless treads. The present invention is directed to improvements in this type of vehicle.

THE PRESENT INVENTION

The present invention proposes various mechanisms for preventing undertension or overtension of the flexible tire-connecting elements, thereby precluding the tire-connecting elements from being stretched, bent or thrown off their guide wheels. The tension-control mechanisms include structures for restraining and guiding the tires in their orbital movement. Tension control is also achieved by special means for keeping the sponson surfaces relatively free of debris, whereby the chains or cables maintain their original spacing relative to the sponsons; i.e. the chains retain their original orbits and thus their original state of tension.

THE DRAWINGS IN DETAIL

Figure 1:
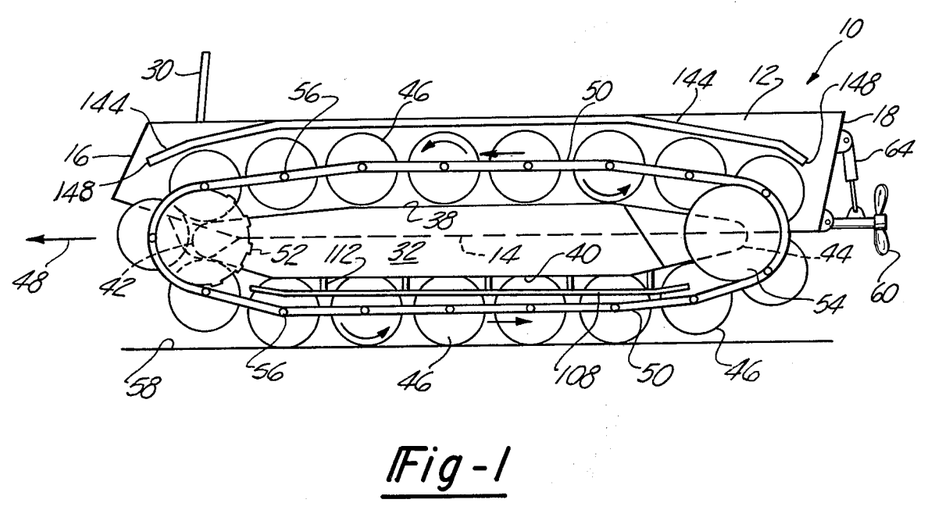
FIG. 1 is a side elevational view of a vehicle incorporating the invention.
Figure 2:
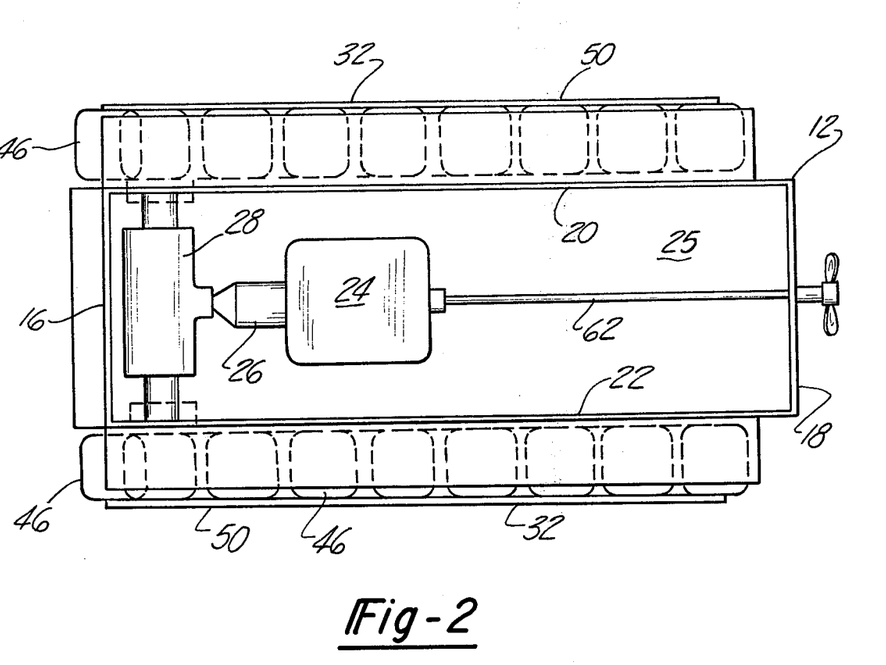
FIG. 2 is a top plan view of the FIG. 1 vehicle.

FIGS. 1 and 2 illustrate a multi-terrain vehicle 10 comprising an open-topped hull 12 having a bottom wall 14, front wall 16, rear wall 18 and side walls 20 and 22. Disposed within the hull is a propulsion engine 24 equipped with a transmission 26 and geared steering unit 28 having laterally-extending output shafts extending through openings in the hull side walls 20 and 22. The steering unit is employed to selectively operate the output shafts in the forward or rearward directions in accordance with the desired vehicle speed and direction of vehicle movement. The driver's seat, not shown, is located above and to one side of transmission 26, a short distance behind windshield 30. Passengers and/or cargo can be accommodated in the space 25 behind engine 24.

Figure 3:
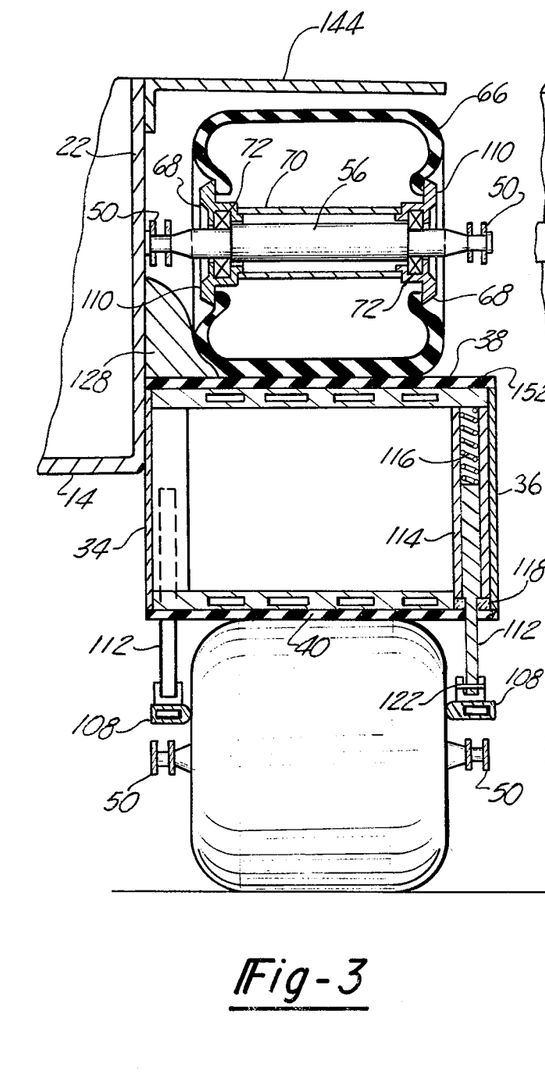
FIG. 3 is a sectional view taken on line 3—3 in FIG. 4.

Located outboard of hull 12 are two longitudinally-extending sponsons 32, each a mirror-image of the other. As seen in FIG. 3 the rightmost sponson comprises an inner side wall 34 secured to hull side wall 22, an outer side wall 36, an upper wall 38, and a lower wall 40. As seen in FIG. 1 the sponson upper and lower walls are joined together by a generally elliptical front nose structure 42 and a generally elliptical rear nose structure 44.

Each of the sponson walls 38 and 40 includes a rigid metal underwall and a resilient elastomeric outer wall or skin; the underwall provides sponson rigidity, and the skin provides a tread surface for tractive engagement with the ground-engaging tires 46.

Arranged for orbital movement about each sponson 32 are seventeen ground-engaging tires 46. Each tire traverses an endless orbit defined by upper sponson wall 38, frontal nose structure 42, lower sponson wall 40, and rear nose structure 44. When the vehicle is travelling in the forward direction, as denoted by numeral 48 in FIG. 1, the lower ones of tires 46 will be travelling rearwardly along sponson surface 40 in a relative sense, and the upper ones of tires 46 will be travelling forwardly along sponson surface 38. Tire movement is accomplished through a power means which includes endless chains 50, sprocket-type drive wheels 52 at the sponson frontal nose, and idler wheels 54 at the sponson rear nose. Chains 50 could be replaced by cables if desired or necessary; cables are advantageous in that they are less susceptible to malfunction due to twisting, bending, clogging, etc.

As shown in FIG. 1, each set of chains 50 is trained around drive sprocket 52 and idler wheel 54; additionally each set of chains is connected to the various tire axles 56. Accordingly, powered movement of the sprocket wheels (by the aforementioned engine 24) produces an orbital movement of the chains 50 and the connected tires 46. The vehicle weight is borne by the tires while engaged with firm ground surface 58. Assuming the vehicle is travelling in the forward direction over firm terrain, the ground-engaged tires will be compressed between ground surface 58 and sponson lower wall 40. Ture compression will produce frictional tractive forces between the tire lower surface and the ground, and between the tire upper surface and the sponson. Such tractive forces combine with chain translational movements to propel the vehicle over firm terrain.

In very loose terrain,. such as deep snow or swamps or loose sand, the vehicle weight can cause the vehicle to sink into the terrain so that the vehicle weight is borne directly by the sponsons rather than by the tires. Under such conditions the tires are subjected to reduced weight loads, and hence reduced tractive engagement with the terrain; the tires may then tend to skid on the sponson lower wall. Translational movement of the lower run of each chain will then translate each tire in piston-like fashion through the terrain, thereby bodily displacing the terrain and reacting the vehicle in the arrow 48 direction (assuming the chains are moving in the FIG. 1 directions). In deep water operations the vehicle may be propelled by means of a propeller 60 located at the stern of the hull and suitably connected to engine 24, as by means of a drive shaft 62 and flexible coupling (not shown). For overland operations the propeller may be retracted upwardly from its FIG. 1 position by a suitable fluid cylinder 64.

TIRE-CHAIN RELATION

FIG. 3 illustrates the general constructional features of a representative tire and its connection to the propelling chains. As there shown, the tire comprises a tire carcass 66 mounted on metal rims 68 carried by a tubular connector 70. Suitable sealed bearings 72 are provided between tube 70 and the supporting axle 56. The outer ends of the axle are affixed to the chains in any suitable fashion, as for example by welding. The axle this travels with the chains, and the tire is free to rotate around the axle on the bearings 72. The annular space defined between tube 70 and tire carcass 66 may be inflated to a suitable air pressure such as 15 p.s.i.; the annular space may be foam-filled for bullet-proofing purposes if found necessary or desirable.

Figure 5:
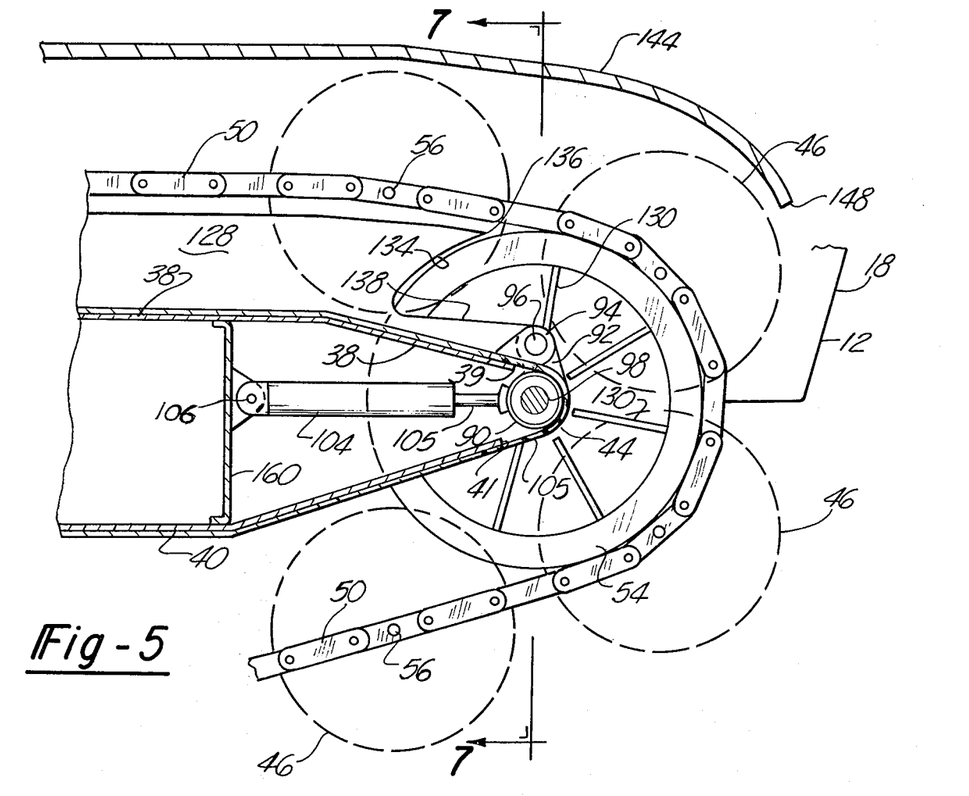
FIG. 5 is a fragmentary side elevational view of a rear nose area of a sponson forming part of the FIG. 1 vehicle.
Figure 6:
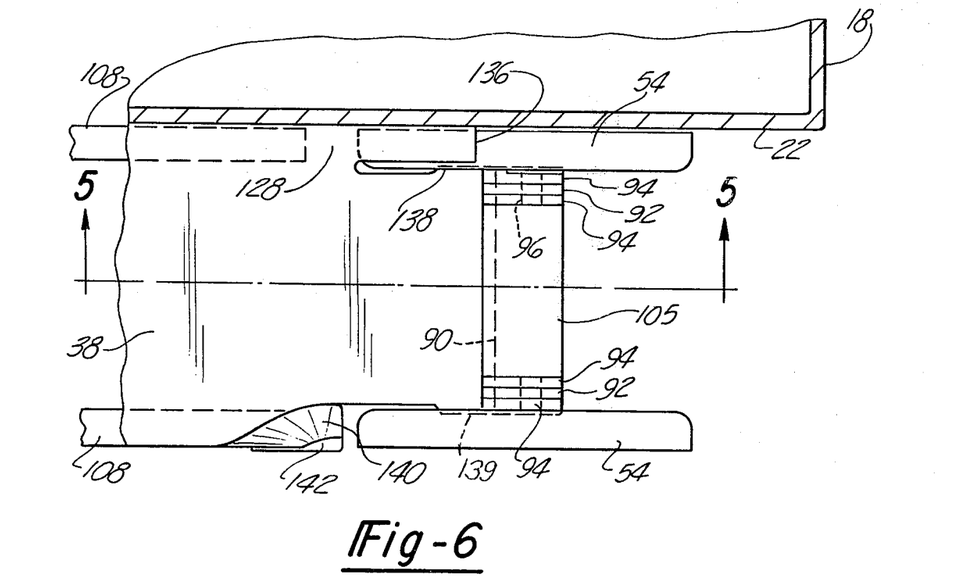
FIG. 6 is a fragmentary top plan view of the FIG. 5 structure.
Figure 7:
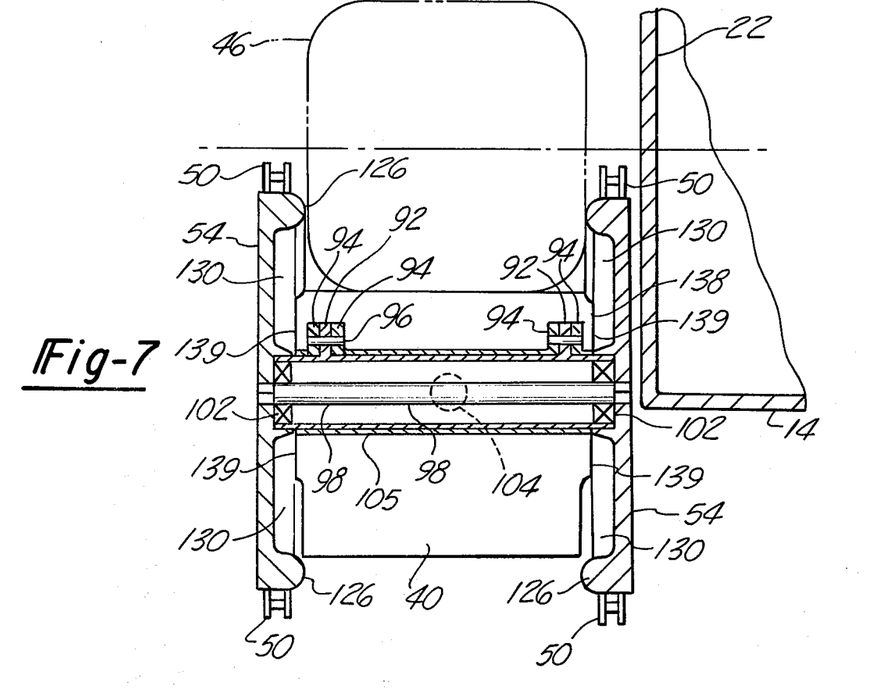
FIG. 7 is an end elevational view of the FIG. 6 structure, parts thereof being shown in section on line 7—7 in FIG. 5.

FLUID CYLINDER CHAIN TENSION CONTROL (FIGS. 5-7)

Figures 8, 9:
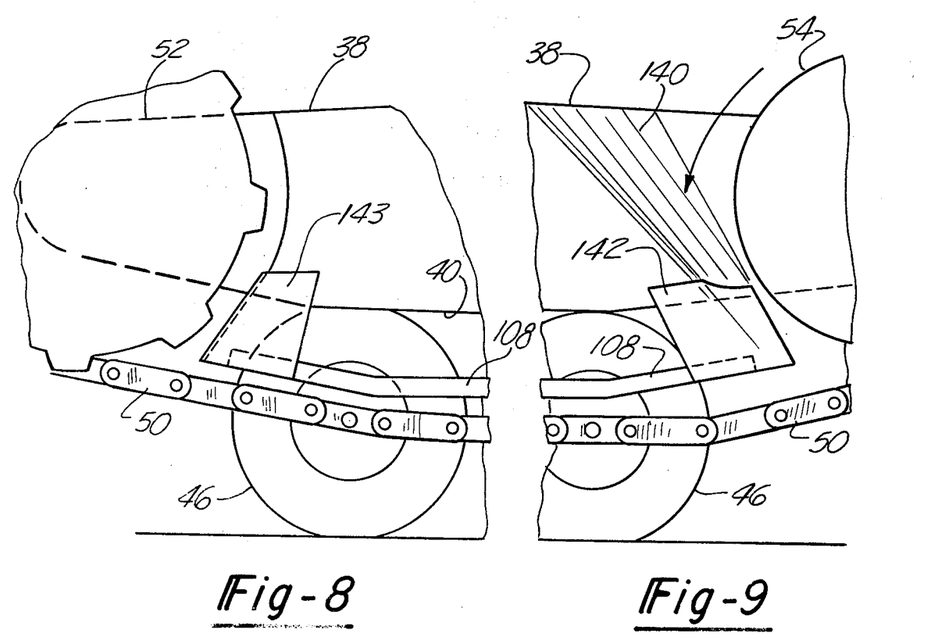
FIG. 8 is a side elevational view of a debris deflector located at the front of the sponson.
FIG. 9 is a side elevational view of debris deflector located at the rear of the sponson.
Figure 10:
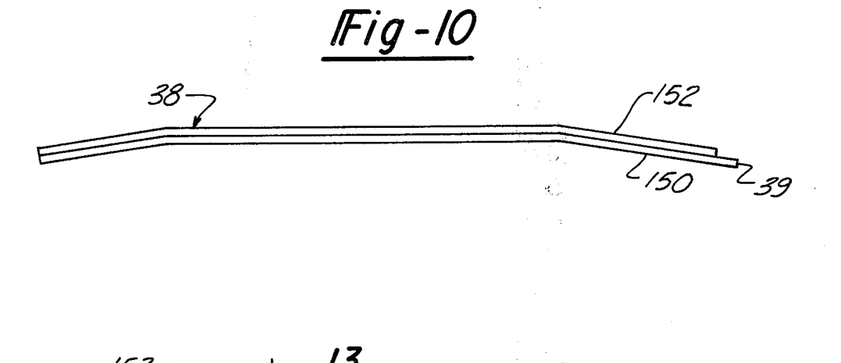
FIG. 10 is a side elevational view of a tread surface employed on the upper face of a sponson used in the FIG. 1 vehicle.

The chain tension may be controlled by a fluid cylinder 104 located at the rear nose 44 of each sponson. Cylinder 104 is located below the sponson upper wall 38 that terminates in a rear edge 39. The sponson lower wall 40 terminates in a rear edge 41. Movably disposed in the space between edges 39 and 41 is a transverse tube 90 suitably connected to the piston rod 105 of fluid cylinder 104. Tube 90 is rockably suspended from the sponson by means of two widely spaced arms 92 (FIGS. 8 and 9) that extend upwardly from the tube into slots defined by lugs 94 that project upwardly and rearwardly from wall 38 adjacent its rear edge 39. Pins 96 extend through openings in the overlapping arms and lugs.

It will be seen that introduction of pressure fluid into the front end of cylinder 104 will cause tube 90 to swing counterclockwise about the axis defined by pins 96. Withdrawal of pressure fluid will permit tube 90 to swing clockwise about the pin 96 axis. To close the clearance space between tube 90 and the sponson edges 39 and 41 there is provided a stretchable flexible sheet 105 extending around the surface of the tube and suitably secured to walls 38 and 40. During swinging movements of tube 90 around the pin 96 axis sheet 105 stretches and relaxes in accordance with tube movement.

Extending within and through tube 90 is a shaft 98 having its opposite ends affixed to laterally spaced idler wheels 54; suitable bearings are interposed between the shaft and tube 90 to permit the shaft and connected wheels 54 to rotate around the shaft axis. Tube 90 normally assumes a fixed position except as required to prevent slack or overtension in the chains 50 trained around wheels 54. Slack in the chains would tend to cause the chains to jump the teeth of drive sprockets 52, especially during braking periods when the torque of the chains was suddenly reversed. Undue slack in chains 50 is prevented by automatic adjustment of tube 90 around the pivotal axis defined by pins 96. The tube adjustment movement may be accomplished by the single acting fluid cylinder 104 located between a fixed pivotal anchorage 106 and tube 90. A hydraulic pump, accumulator and pressure-relief valve, not shown, may be arranged to maintain a desired range of pressures, e.g. 2100–2300 p.s.i., in cylinder 104. The internal cylinder pressure opposes the load imposed on the tube 90 by chains 50. Accordingly, any reduction in the imposed chain loading permits piston rod 105 to shift tube 90 counterclockwise about pivot axis 96 to thereby reestablish the chain loading or tension; this operation serves to take up or prevent chain slack. Preferably the internal pressure in cylinder is remotely adjustable from the driver seat (by adjustment of the amount of fluid in the cylinder and/or actuation of the pressure relief valve) to vary the chain tension under special circumstances, e.g. to relieve unduly high chain tension generated by high tire pressures or debris build-up on the sponson surfaces or in the teeth of drive sprocket wheel 52. In this connection it will be appreciated that overinflated tires will cause the shafts 56 to be spaced further from the sponson surfaces 38 and 40, thereby biasing the chains away from said surfaces to unduly increase chain tension. Similarly, debris accumulations on the sprockets or sponson surfaces will increase chain tension. Fluid cylinder 104 can be used to prevent undertension or overtension.

TENSION CONTROL-TIRE SIDE RESTRAINT

While the vehicle is travelling over flat level pavement the terrain-engaged tires will usually run straight and true along lines paralleling the direction of vehicle travel. However, when the vehicle encounters obstructions, or runs along the side of a hill, or is undergoing a turning operation from one direction to another; the ground-engaged tires are subjected to lateral loadings or forces that tend to force the tires sidewise or askew of the intended directional path. Such sidewise movement of the tires tends to twist or drag the connector chains 50 from their intended paths or planes; the inposed forces tend to bend the chains to cause them to eventually jump off the teeth of sprocket wheels 52. Accordingly, as a preventive measure the vehicle is preferably designed to include restraint means for preventing sidewise motions of the tires, especially while they are engaged with the ground surface. In the illustrated device, as best shown in FIGS. 1 and 3, such restraint means includes rub rails 108 extending alongside the ground-engaged tires. FIG. 3 illustrates the rub-rails in cross section, while FIG. 1 illustrates the lengths of the rub rails. As seen in FIG. 1, each rub-rail extends along and beyond the entire span of the ground-engaged tires. The aim is to guide and restrain the tires while they are subject to the major distrubing loads; i.e. loads imposed by the ground surface.

In order to have maximum restraining effect the rub rails engage the tires as close to the tire center lines as possible. As seen in the drawings, the rub-rails engage the tires slightly above the tire centerlines. In order to minimize wear it is preferred that the rub rails be spaced apart so that each rail engages both the metal rim portions and the elastomeric carcass portions of the tires. The rim portion of each wheel may be provided with an annular outwardly raised surface 110 (FIG. 3) designed to rubbingly engage the rub rail 108; at the same time the elastomeric carcass wall engages the rub rail so that the rubbing load is distributed on both the metal and rubber areas of each tire. If the rubbing load were borne entirely by the elastomeric surface it would tend to overheat. If the rubbing load were borne entirely by metal surface 110 the metal rail 108 would tend to be cut or abrade so as to form sharp edges; during periods of tire distortion, as on sharp turns and climbing steep slopes, the tire carcass would be cut by the sharp edges. By distributing the rubbing load between the metal and elastomeric surfaces the rub rail is kept smooth and free of sharp edges. The tire air pressure can be adjusted to maintain a certain degree of control on the rubbing action.

The rub rails function in somewhat the same fashion as guides 29 and 30 in U.S. Pat. No. 2,463,121 issued to J. P. Sapp. However the present rub rails are associated with parallel flexible elements 50 that exert duplicate pulling forces on each end of each axle 56. There is an absence of cantilever effects which would impose wearing stresses on the guide mechanisms.

Figure 4:
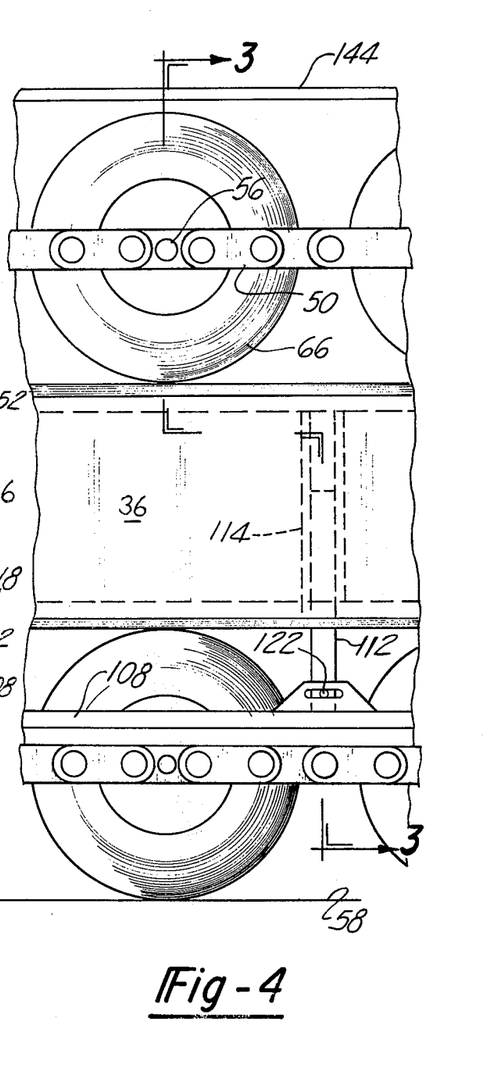
FIG. 4 is an enlarged fragmentary view in the same direction as FIG. 1, but at a point midway between the front and rear ends of the vehicle.

When the vehicle is traversing rocky areas or deeply rutted zones the tires can deflect and compress vertically to an abnormal degree. The compression can be sufficient to reduce the vertical spacing between each tire axle 56 and the sponson lower wall 40. Such action can cause the chains 50 to strike the undersides of the rub rails 108. To prevent the possibility of parts breakage or distortion the rub rails are floatably mounted on the sponsons in shock-absorbing relation. As shown in FIGS. 3 and 4, each rub rail 108 is connected to vertical bars 112 that slide within sleeves 114 suitably affixed within the sponson. Compression springs 116 bias bars 112 downwardly to the FIG. 3 position; keeper plates 118 are carried by each bar 112 to limit the downward movement of each bar 112. Normally springs 116 will maintain rub rails 108 in their FIG. 3 positions slightly above the tire centerlines; should the terrain exert a jarring action on the tires to force the tire axles upwardly the springs 116 will permit rub rails 108 to be deflected when they are struck by chains 50. The effect is to prevent breakage or distortion of the chains or rub rails.

In certain instances only one or a few of the ground-engaged tires will be jarred upwardly by the terrain sufficient distances to deflect rail 108. The rail may then deflect or bend upward locally within its elastic limit. The localized upward bending action tends to pull the other non-bent areas of the rail longitudinally toward the bent areas. To compensate for longitudinal movement of the rail the rail is joined to each vertical bar 112 by means of a pin-slot joint 122. Such a joint permits the rail to slide longitudinally without stressing the bar-rail joint.

Lateral tire restraint is preferably continued or accomplished while the tire is moving around the drive sprockets and idler wheels at the front and rear ends of each sponson. Thus, as shown in FIG. 7, each idler wheel 54 is provided with an annular rub rail 126 engageable with a side surface of the tire while it is within the space between the two wheels. Similarly, each drive sprocket wheel is provided with an annular rub rail. The aforementioned rub rails 108 (FIG. 1) are of sufficient length as to restrain each tire until it enters into the sprocket wheel space or idler wheel space. Therefore each tire is laterally restrained or guided while in the wheels 52, 54, and also while on the ground to thereby prevent chains 50 from being dislodged or thrown off wheels 52 and 54.

There is limited tire guidance while the tire is riding on the sponson upper wall 38. Such limited guidance is provided by the hull side wall 20 or 22 and a filler wall 128 (FIGS. 3 and 5). As shown in FIG. 3 the upper run of the inner chain extends close to hull wall 22, and the side surface of the tire extends close to filler wall 128; this relationship prevents inward wandering of the tires. There is no guidance against wandering of the tires outwardly away from wall 20 or 22, but such action is not a major problem because tire disturbing forces are not of appreciable magnitude while the tire is running along the sponson upper surface. Major disturbing loads are generated by reaction of the ground on the tires.

TENSION CONTROL-VEGETATION REMOVAL

During operations in muddy or swampy terrain there is a tendency for soggy vegetation, such as muddy leaves, stems, roots and branches, to collect on the tires, chains, sprockets and sponson surfaces. Such collections have an adverse effect on vehicle performance in that they tend to artificially increase the dimensions of the cooperating mechanisms to thereby overstress the chains and thus stall the vehicle, either by increasing the friction loads or by breaking the chains. Such collections can also overstress the sponson structure which is preferably thin gage construction for weight reduction purposes. The vehicle preferably includes mechanisms to prevent vegetation build-ups and compactions. Compacted vegetation is particularly undesired because it tends to weld to the vehicle surface and to itself, thereby assuming a rigid character that resists dislodgement.

Each idler wheel 54 is provided with relatively thin cutter bars 130 passing relatively close across the sponson side surfaces 139 to exert a chopping or slicing action on vegetation that enters into the clearance space between the idler wheel and the sponson side surface. Cutter bars 130 do not project quite as far inwardly as rub rails 126 since they would then have a tendency to cut the tires. Similar cutter bars are provided on the sprocket wheels 52.

Each idler wheel 54 is devoid of sprocket teeth. By thus making the wheel with smooth outer peripheral surfaces it is possible to minimize vegetation buildup on such surfaces. The absence of teeth also eliminates the possibility of chain damage from improper engagement of the sprocket teeth and chain. The chains are retained or aligned on the smooth surfaced idler wheels by reason of the fact that the associated tires are restrained against lateral displacement by rub rails 126.

As each tire 46 moves up and around the idler wheels 54 it tends to drag vegetation into the clearance space between the hull side wall and tire inner surface. Accordingly the structure is designed so that the clearance space is filled in by a filler wall 128, whose cross section is shown in FIG. 3. The filler wall extends along the entire length of the sponson area between the idler wheel and sprocket wheel, thereby preventing debris from packing between the hull side wall and the sides of the tires in such fashion as would impede tire travel and thereby overstress the chains. The moving chain tends to drag vegetation through the area above the sponson, without allowing it to collect between the tire side surface and the hull side wall (22 or 20). Filler wall 128 reduces the lateral thickness of the vegetations, which facilitates their movement along the sponson upper face. Thin vegetation accumulations can be moved whereas thicker vegetations tend to compact into rigid immovable masses. As seen in FIG. 5, filler wall 128 includes an arcuate end surface 134 that extends into close adjacency with the peripheral edge of an idler wheel 54 to define a narrow clearance space (FIG. 5) and thin tip surface 136. Surface 136 tends to shed vegetation onto the filler wall instead of into clearance space 134 where it could entangle in the idler wheel. A similar edge is formed at the other end of wall 128 to deflect debris from sprocket wheel 52.

As seen in FIG. 5, wall 128 is continued rearwardly to form a thin side edge 138 that sheds vegetation onto the sponson upper surface rather than into the joint between the sponson and idler wheel. Rolling movement of the tires on the sponson upper surfaces tends to carry and/or throw the vegetation upwardly into the path of the next advancing tire, which then propels the vegetation forwardly. Eventually the vegetation is removed, either at the sponson front edge or sponson outer side surface 36. A chevron tire tread pattern on each tire is believed to assist in the vegetation removal operation.

During forward movement of the vehicle vegetation tends to be thrown from sponson upper surface 38 into the wheel cavity area 140 (FIGS. 6 and 9) located directly in front of the outer idler wheel 54. The sponson surface at this point is preferably formed to slope outwardly from top to bottom, and also outwardly from rear to front, i.e. the sponson is locally relieved. Such a sloped relief area tends to cause vegetation to be shed outward laterally beyond the plane of the outer wheel 54, such that the vegetation avoids the potential compacting zone defined by the outer idler wheel, the wheel cavity surface of the sponson, and the lower oncoming chain 50. A deflector element 142 may be carried at the rear end of each rail 108 to further deflect vegetation away from the chain-idler wheel joint. A somewhat similar deflector 143 (FIG. 8) is provided at the front end of each rail 108. Elements 142 and 143 are omitted from FIG. 1.

As seen in FIGS. 1, 3 and 5, each sponson is provided with an overlying fender 144 that extends alonng the full sponson length to define a tire channel only slightly larger than the tire diameter. The front and rear end portions of each fender are curved downwardly to maintain relatively small tire-fender clearances while the tire is entering the channel (forward and reverse directions). The defined end edges 148 of the fender tend to deflect tall stems, branches etc. from the tire channel, thus minimizing the vegetation build-up problem. The relatively small clearance between the fender and tire tends to cause vegetation adhering to the tires to be carried through the channel instead of revolving with the tire. The fender acts as a scraper device or tire deflector device to break up vegetations on the tire surface, and to limit the thickness of such vegetations, thereby keeping the tires relatively clean. The described devices prevent or retard vegetation build-ups whether the vehicle is travelling in the forward direction or the rearward direction.

TENSION CONTROL - ICE REMOVAL (FIGS. 10–13)

During winter operations there is a tendency for ice accumulations to form on the sponson surfaces. Such accumulations artificially increase the vertical dimensions of the sponsons and thereby overstress the chains or cables. The lower sponson wall 40 is in pressure contact with tires 46 so that the tires break ice accumulations clear of sponson wall 40. The sponson upper wall 38 has relatively light pressure engagement with tires 46. Therefore the tires may not be able to break or dislodge ice accumulations on the sponson upper surface, especially if the ice is intermixed with mud, sand, grass, twigs, etc. Such frozen mixtures tend to bind together into a tough coating that is resistant to cracking by the tires. In order to facilitate crack-up of such frozen masses the sponson upper wall 38 may be provided with a semi-rigid skin having areas of differing rigidity. The more rigid areas remain relatively rigid, while the less rigid areas yield under tire weight or pressure to bend and flex, thereby wrinking or changing the skin contour and thus breaking the skin-ice interface. A suitable skin construction is shown in FIGS. 10 through 13.

Figure 11:
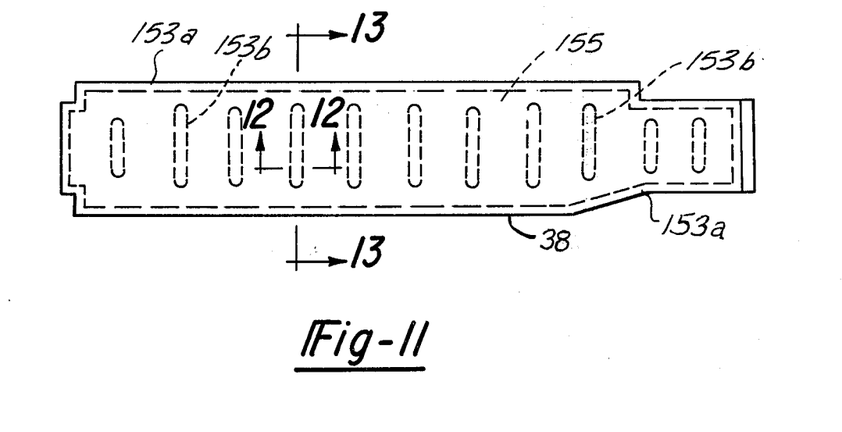
FIG. 11 is a top plan view of the FIG. 10 structure.
Figure 12:
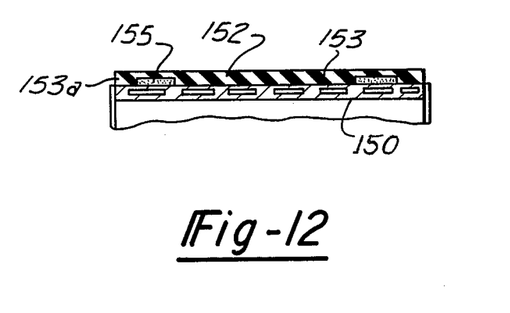
FIGS. 12 and 13 are fragmentary sectional views taken on lines 12—12 and 13—13 in FIG. 11.
Figure 13:
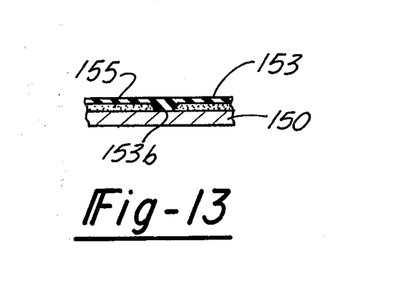

The plan countour of wall 38 is shown in FIG. 11. Fig. 12 shows the wall cross section, consisting of a rigid metal underwall 150 and a semi-rigid skin 152. Metal wall 150 may be a hollow aluminum extrusion for purposes of strength and lightness. Skin 152 is shown as a relatively rigid elastomeric sheet 153 (approximately 80 shore durometer), and a second relatively deformable sheet 155 of foam rubber. Sheet 153 comprises a relatively thick peripheral area 153a and relatively thick internal rib or pad areas 153b. The composite skin sheet (elements 153 and 155) may be suitably adhered to metal wall 150, as by adhesives.

Assuming the presence of frozen accumulations on the outer surface of sheet 153, as the tires roll over the ice the tire pressure will tend to flex those portions of elastomer 153 that overlie the yielding resilient sheet 155; the relatively rigid rib areas 153b will tend to remain rigid under the tire pressure. The flexing of the elastomer will impart a bending stress to the frozen mass. The frozen mass thereby cracks to relieve the stress, thus facilitating removal from the sponson surface.

In some instances the frozen masses on elastomer 153 will cause the tires to compressively act on the undersurface of fender 144. The tire will in that case exert an additional reaction squeezing force on the frozen accumulations. The small tire-fender clearance is therefore advantageous during winter operations.

SUMMARY OF FEATURES

There is disclosed a vehicle having miscellaneous cooperating structures for preventing overstress in the tire-connector elements 50 or dislodgement thereof from the guide wheels 52 and 54 while the vehicle is travelling over various different types of terrain. The principal stress-relief and anti-dislodgement action are by means of the fluid cylinder 104 (FIG. 5) and the tire-guide structures, i.e. elongated rub rails 108 (FIG. 3) and wheel rub rails 126 (FIG. 7). Further relief against excessive chain tension is provided by the vegetation removal structures, principally the cutter bars 130 (FIG. 7), the local sponson relief areas 140 (FIGS. 6 and 9) and the filler wall 128 (FIGS. 3 and 5). Other relief against excessive chain tension is provided by the ice breaker pad structure shown in FIGS. 10 through 13. The various structures enable the vehicle to operate in various climates and terrains without such overstressing or throwing of the tire-connector chains as would result in chain breakage or frictional stalling of the vehicle.

We claim:

1. A multi-terrain vehicle comprising a hull having a pair of outboard sponsons; rotary terrain-engaging tires arranged for orbital movement about each sponson; means for powering the tires comprising a pair of guide wheels at opposite ends of each sponson, and sets of endless flexible tire-connector elements trained around said wheels to interconnect the tires at their center lines, thereby exerting duplicate tire-pulling forces at both side faces of each tire; and means limiting the stress imposed on the connector elements during operation of the vehicle over a range of terrains; said stress-limiting means comprising: two rub rails disposed below each sponson to restrainably engage the side faces of the associated tires slightly above the tire center-lines, said rails being of sufficient length to restrainably engage all tires while they are in contact with the terrain and until captured by the aforementioned wheels; each rub rail being floatably suspended from its sponson for upward displacement in response to momentary upward deformation of the tires and tire-connector elements.

2. The vehicle of claim 1: each tire comprising a rigid rim structure and a resilient tire carcass; said rim structure and tire carcass each having annular surfaces thereof simultaneously engageable with the associated rub rail to cooperatively share the rubbing load.

3. A multi-terrain vehicle comprising a hull having a pair of outboard sponsons; rotary terrain-engaging tires arranged for orbital movement about each sponson; means for powering the tires comprising a pair of guide wheels at opposite ends of each sponson, and sets of endless flexible tire-connector elements trained around said wheels to interconnect the tires at their center lines, thereby exerting duplicate tire-pulling forces at both side faces of each tire; and means limiting the stress imposed on the connector elements during operation of the vehicle over a range of terrains; said stress-limiting means comprising: two rub rails disposed below each sponson to restrainably engage the side faces of the associated tires slightly above the tire center lines, said rails being of sufficient length to restrainably engage all tire while they are in contact with the terrain and until captured by the aforementioned wheels; said stress-limiting means further comprising a semi-rigid skin structure on the upper surface of each sponson to crack frozen accumulations thereon in response to tire pressure forces; said semi-rigid skin structure including contiguous areas of different rigidity spaced along the sponson surface whereby the tires advance over the skin structure to deflect the less rigid areas without substantially deflecting the more rigid areas.

4. The vehicle of claim 3: said skin structure comprising an outer flexible skin and relatively rigid pads interposed between the sponson upper face and flexible skin at spaced points along the sponson surface, whereby the outer skin areas between the pads are bowed under tire loads to effect cracking of frozen accumulations.

* * * * *